(12) United States Patent
Ishimori et al.

(10) Patent No.: US 6,513,312 B1
(45) Date of Patent: Feb. 4, 2003

(54) MOWER WITH A GRASS CATCHER

(75) Inventors: Shoso Ishimori, Sakai; Nobuyuki Yamashita, Izumi; Takashi Fujii, Sakai; Kazuaki Kurohara, Sakai; Shinichiro Saji, Sakai, all of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/652,778

(22) Filed: Aug. 31, 2000

(30) Foreign Application Priority Data

Mar. 30, 2000 (JP) ........................................ 2000-094603

(51) Int. Cl.⁷ .............................................. A01D 34/70
(52) U.S. Cl. ........................................... 56/203; 56/202
(58) Field of Search ..................... 56/16.6, 202, 203, 56/204, 205, 249, 504, 505, 16.8, 16.9

(56) References Cited

U.S. PATENT DOCUMENTS

| | | | |
|---|---|---|---|
| 4,523,788 A | 6/1985 | Prasad ........................ | 298/11 |
| 4,972,666 A | * 11/1990 | Peruzzo ...................... | 56/206 |
| 5,193,882 A | 3/1993 | Gamaldi ..................... | 298/11 |
| 5,687,555 A | 11/1997 | Klein ......................... | 56/249 |
| 5,806,293 A | 9/1998 | Klein et al. ................ | 56/249 |
| 5,921,073 A | * 7/1999 | Cash .......................... | 56/202 |
| 6,012,273 A | 1/2000 | Ogasawara et al. .......... | 56/16.6 |
| 6,050,072 A | * 4/2000 | Chabrier et al. ............ | 56/202 |

FOREIGN PATENT DOCUMENTS

| | | |
|---|---|---|
| DE | 4113828 | 10/1992 |
| FR | 2569632 | 3/1986 |
| FR | 2746253 | 9/1997 |
| FR | 2768590 | 3/1999 |
| JP | 4258209 | 9/1992 |
| JP | 515229 | 1/1993 |
| JP | 538220 | 2/1993 |
| JP | 6225614 | 8/1994 |
| JP | 9252624 | 9/1997 |
| JP | 1189385 | 4/1999 |
| JP | 3021701 | 9/2000 |

* cited by examiner

*Primary Examiner*—Robert E. Pezzuto
(74) *Attorney, Agent, or Firm*—Webb Ziesenheim Logsdon Orkin & Hanson, P.C.

(57) ABSTRACT

A mower with a grass catcher (10) for collecting grass clippings transmitted from a mower unit. The grass catcher has an inlet opening (12) in a front position thereof, and an outlet opening (13) and an openable lid (14) in a rear position. The grass catcher (10) is connected to the rear end of a vehicle body to be supported in a suspended state by a grass catcher support unit (100). The support unit includes mounting posts (9) attached to the rear end of the vehicle body and extending upward, and a support link mechanism (20) for interconnecting upper regions of the mounting posts and lower rearward regions of the grass catcher, and for switching the grass catcher between a grass clippings collecting posture with the inlet opening directed forwardly of the vehicle body, and a raised dumping posture with the outlet opening directed downward. The support link mechanism performs a switching process for switching the grass catcher from the grass clippings collecting posture to the raised dumping posture. The switching process includes a translating process for translating the grass catcher obliquely rearward and upward while maintaining the grass catcher substantially parallel to the grass clippings collecting posture, and a rotating process for rotating the grass catcher until the outlet opening is directed downward.

5 Claims, 7 Drawing Sheets

MOWER WITH A GRASS CATCHER

BACKGROUND OF THE INVENTION

1. Field of the Invention

This invention relates to a mower including a vehicle body, a mower unit connected to the vehicle body, a grass catcher for collecting grass clippings transmitted from the mower unit, and a grass catcher support unit for supporting the grass catcher in a rear position of the vehicle body. The grass catcher has an inlet opening formed at a front end thereof, and an outlet opening with an openable lid at a rear end.

2. Description of the Related Art

In a conventional mower with a grass catcher for collecting grass such as lawn cut by a mower unit, the grass catcher is supported by a pair of upper and lower links acting as a grass catcher support unit. Typically, the grass catcher is placed in a grass collecting posture with an inlet opening opposed to the vehicle body. From this position the grass catcher is raised by pushing up the links with a hydraulic cylinder. Subsequently, the grass catcher is rotated about a transverse axis disposed at an upper end thereof, to direct the inlet opening downward for allowing the grass clippings to fall out of the grass catcher (see Japanese Patent Laying-Open Publication H-11-89385, for example).

The conventional grass catcher support unit noted above is useful in that grass clippings may be discharged from the grass catcher raised high. However, the operation for discharging grass clippings tends to be difficult to perform smoothly since the inlet opening must then be directed downward to discharge the grass clippings therethrough.

That is, the grass catcher receives grass clippings from the mower unit as entrained by air flows through a blast duct. The blast duct has a limited diameter since it is necessary to maintain a sufficient air speed through the duct and to pass the duct through a narrow space under the vehicle body. The inlet opening tends to be formed with a small diameter approximately corresponding to the duct diameter, which is small for the size of the grass catcher. As a result, grass clippings are discharged through the small inlet opening in a rather inefficient way.

Where the above grass catcher support unit is employed, grass clippings are discharged in a position relatively close to the vehicle body though from an elevated level. This causes an inconvenience that grass clippings discharged from the grass catcher tend to fall on the vehicle body.

SUMMARY OF THE INVENTION

The object of this invention is to provide a mower with a grass catcher and a grass catcher support unit, in which grass clippings may be discharged through an outlet opening formed separately from an inlet opening of the grass catcher, from an elevated level, and away from a vehicle body.

The above object is fulfilled, according to this invention, by a mower comprising a grass catcher connected to the rear end of a vehicle body to be supported in a suspended state by a grass catcher support unit. The support unit includes mounting posts attached to the rear end of the vehicle body and extending upward, and a support link mechanism for interconnecting upper regions of the mounting posts and lower rearward regions of the grass catcher, and for switching the grass catcher between a grass clippings collecting posture with an inlet opening thereof directed forwardly of the vehicle body, and a raised dumping posture with an outlet opening directed downward. The support link mechanism performs a switching process for switching the grass catcher from the glass clippings collecting posture to the raised dumping posture. The switching process includes a translating process for translating the grass catcher obliquely rearward and upward while maintaining the grass catcher substantially parallel to the grass clippings collecting posture, and a rotating process for rotating the grass catcher until the outlet opening is directed downward.

With the above construction, when the grass catcher is switched from the grass clippings collecting posture to the raised dumping posture, the grass catcher moves obliquely rearward and upward in an initial stage of the switching. Compared with a case where the grass catcher moves only upward in the initial stage, the grass catcher is separated smoothly from a duct extending from the vehicle body. The grass catcher raised is rotated about a position adjacent the rearward outlet opening to a posture with the front inlet opening directed upward. Thus, in the raised dumping posture of the grass catcher, the outlet opening is directed downward in a rearward position away from the vehicle body. Consequently, grass clippings may be discharged smoothly by using the outlet opening which is less restricted in size than the inlet opening. A position where the grass clippings are dumped may easily be set away from the vehicle body.

The above features of this invention provide various advantages as follows. When the grass catcher is switched from the grass clippings collecting posture to the raised dumping posture, the grass catcher moves obliquely rearward and upward in the initial stage of the switching. Consequently, the grass catcher is separated smoothly from the blast duct even where the duct has a rear end thereof inserted slightly into the grass catcher to avoid leakage of grass clippings. Since the grass catcher is raised, and is rotated about a position adjacent the rearward outlet opening to a posture with the front inlet opening directed upward, the outlet opening directed downward in the raised dumping posture of the grass catcher lies at a considerable height from the ground and away from the vehicle body. As a result, grass clippings may be discharged smoothly by using the outlet opening which is less restricted in size may be formed larger than the inlet opening. The grass clippings may be dumped easily onto an elevated position spaced from the vehicle body, such as a load-carrying bed of a truck or other platform.

Further, since a completely free space is provided between the grass catcher and the ground, a container or a truck may be brought very close to the rear end of the vehicle body for receiving grass clippings discharged from grass catcher.

In one preferred embodiment of this invention, the support link mechanism includes a quadric crank mechanism having fixed links disposed in the upper regions of the mounting posts, and intermediary links disposed in the lower rearward regions of the grass catcher and extending substantially parallel to the fixed links, and a rotating mechanism for rotating the grass catcher about a transverse axis relative to the intermediary links. By using the quadric crank mechanism with the fixed links and intermediary links set to the above-noted positions, and the rotating mechanism for rotating the grass catcher about a transverse axis, the grass catcher is raised while moving the inlet opening away from the blast duct, and is rotated about the position adjacent the outlet opening to the posture with the inlet opening directed upward and away from the vehicle body. The exit opening is positioned away from the vehicle body side and is directed downward.

Thus, the quadric crank mechanism and rotating mechanism constitute a simple construction for turning the outlet opening downward in a position away from the vehicle body.

That is, this preferred embodiment uses the quadric crank mechanism having fixed links disposed in the upper rear region of the vehicle body, and intermediary links disposed adjacent the outlet opening. This mechanism acts both to raise the grass catcher and to move the inlet opening away from the blast duct. In addition, the intermediary links of this mechanism may be utilized as a position providing the transverse axis of the rotating mechanism. This provides an advantage of simplifying the construction of the support mechanism having the function to change the posture of the grass catcher.

In a further preferred embodiment of this invention, the quadric crank mechanism includes top links and lower links interconnecting the fixed links and the intermediary links, and extending with an angle of inclination approximately from 30 to 50 degrees in the grass clippings collecting posture of the grass catcher. The length of the links are effectively used to secure a raising and lowering stroke.

A lid opening mechanism may be provided for converting a rotation of the grass catcher to the dumping posture, into a movement for opening the openable lid. Then, the lid of the grass catcher in the dumping posture may be opened automatically by using the drive of the rotating mechanism which rotates the grass catcher about the transverse axis.

Other features and advantages of this invention will be apparent from the following description of the embodiment to be taken with reference to the drawings.

DESCRIPTION OF THE PREFERRED EMBODIMENT

An embodiment of this invention will be described hereinafter with reference to the drawings.
[Overall Construction]

Figure 1:
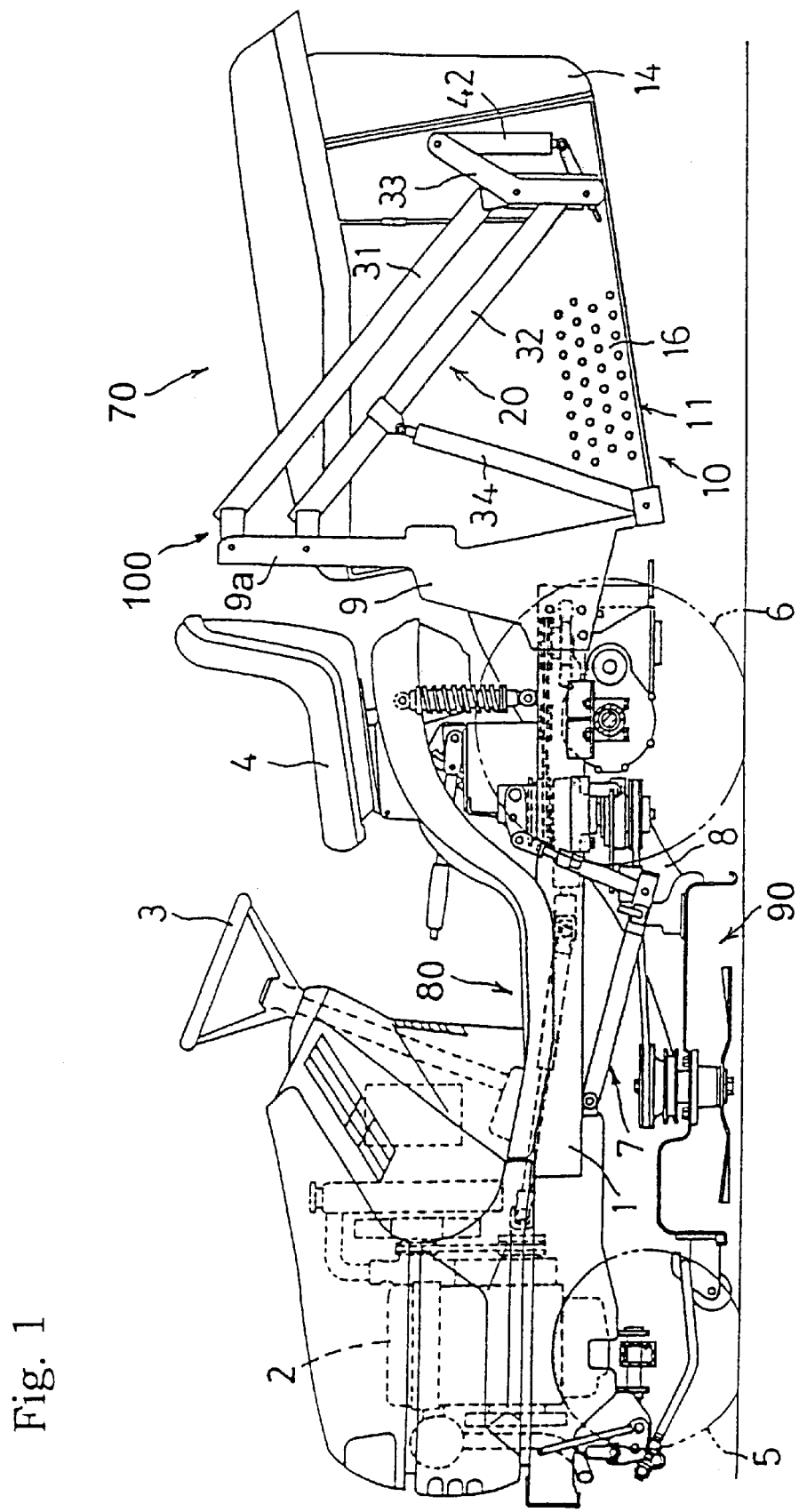
FIG. 1 is a side elevation of a mower.

FIG. 1 shows a mid-mount type riding mower.

This mower includes an engine 2 mounted on a forward portion and a driver's seat 4 on a rearward portion of a vehicle body 80. A steering wheel 3 is disposed forwardly of the seat 4. A well-known grass cutting mower unit 90 is disposed under body frames 1, Grass clippings cut by the mower unit 90 are transmitted through a duct 8 to a grass collecting device 70 disposed rearwardly of the vehicle body 80. Numeral 5 in FIG. 1 denotes dirigible front wheels. Numeral 6 denotes rear drive wheels. Numeral 7 denotes a link mechanism for vertically movably suspending the mower unit 90 disposed under the vehicle body between the front and rear wheels.

Figure 2:
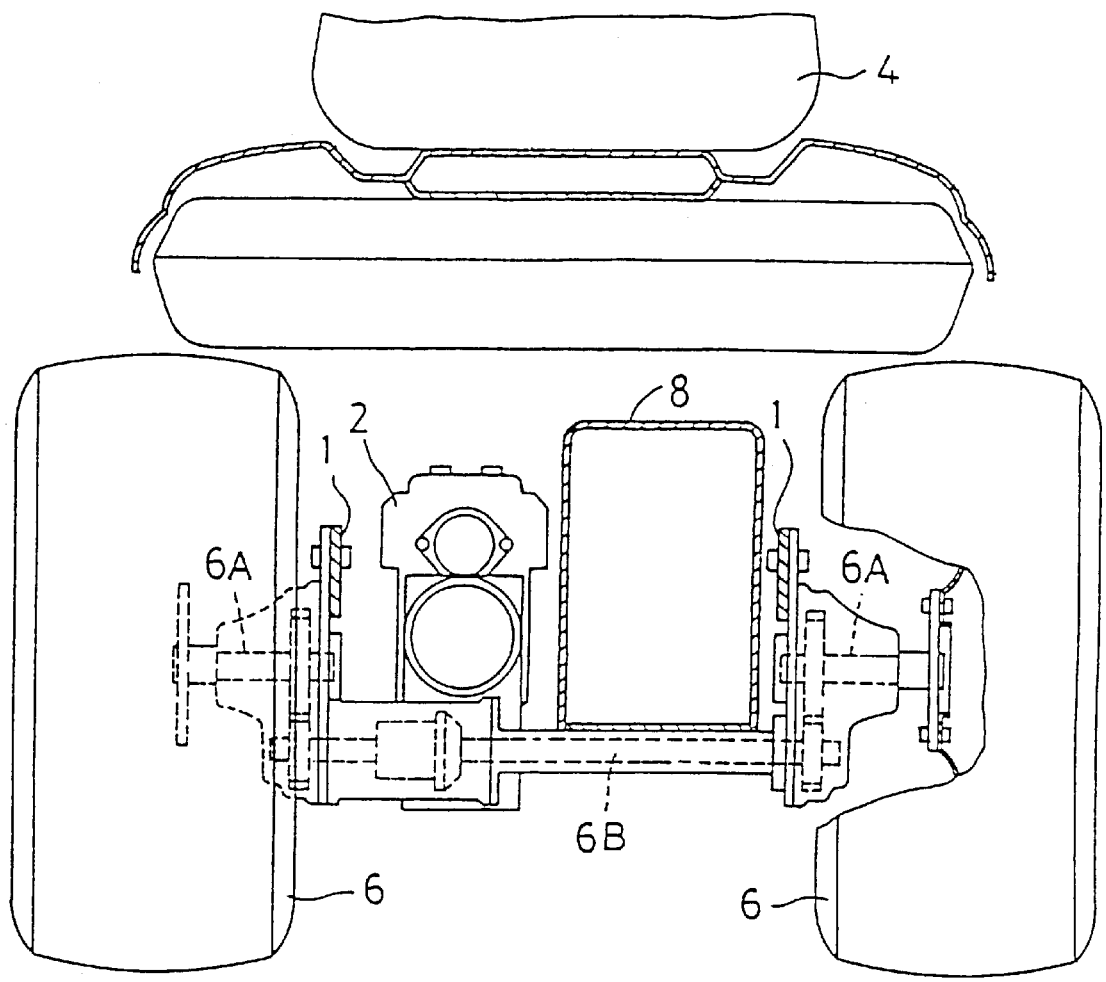
FIG. 2 is a rear view, partly in section, showing a portion adjacent rear wheels.

As shown in FIG. 2, the duct 8 extends in the fore and aft direction from the mower unit 90 disposed forwardly of the rear drive wheels 6 to the grass collecting device 70 disposed rearwardly of the vehicle body, through a space between the driver's seat 4 and differential shafts 6B disposed below and operatively connected to axles 6A of right and left rear drive wheels 6, and between the right and left body frames 1.
[Grass Collecting Device]

The construction of grass collecting device 70 will be described next.

The grass collecting device 70 includes a grass catcher 10, and a support unit 100 for connecting the grass catcher 10 to the rear end of vehicle body 80 or body frames 1 to be supported in a suspended state. The support unit 100 includes mounting posts 9 disposed at the rear end of vehicle body 80, and a support link mechanism 20 for connecting the grass catcher 10 to the mounting posts 9.

Figure 3:
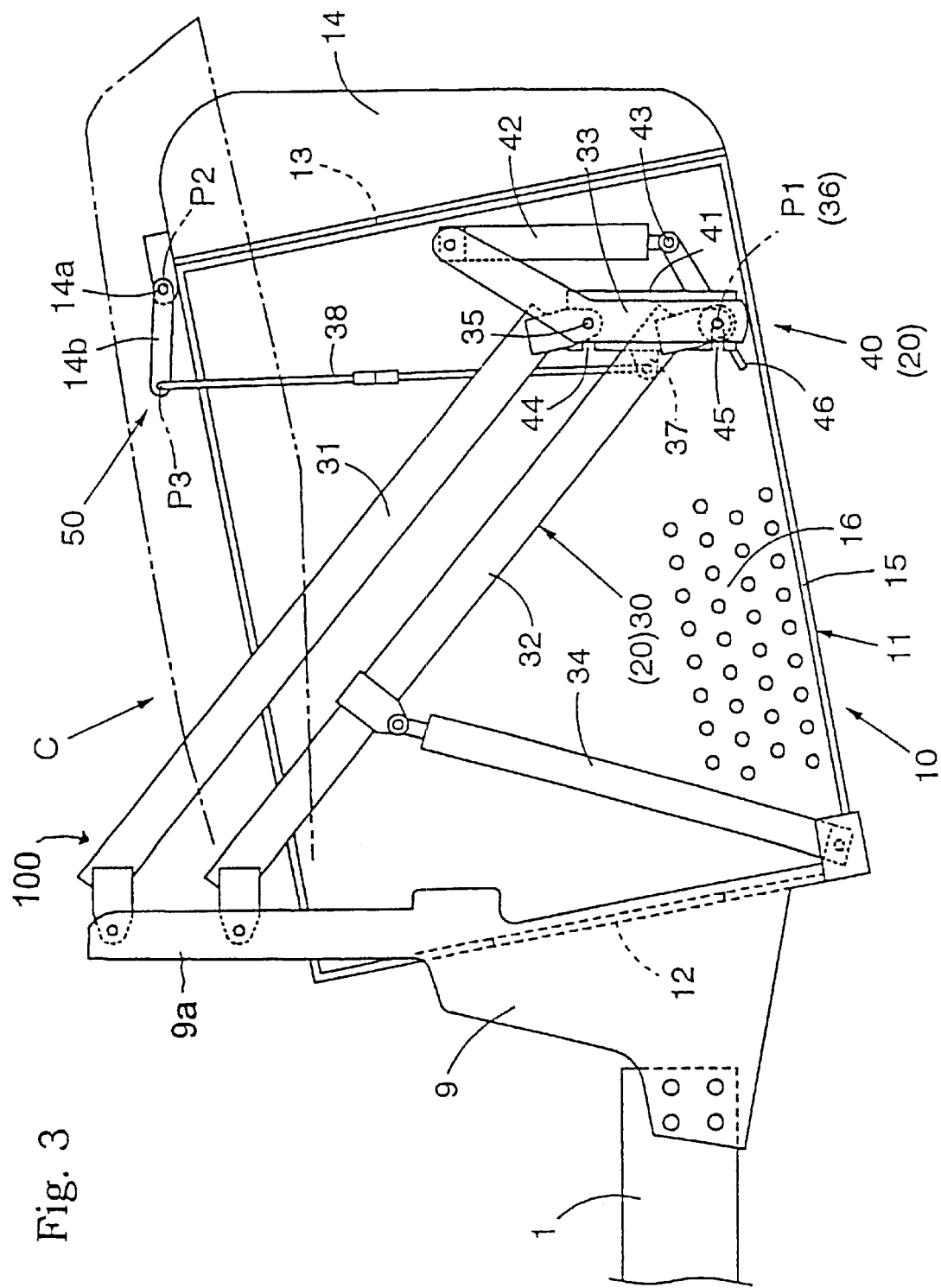
FIG. 3 is a side view of a grass collecting device.
Figure 4:
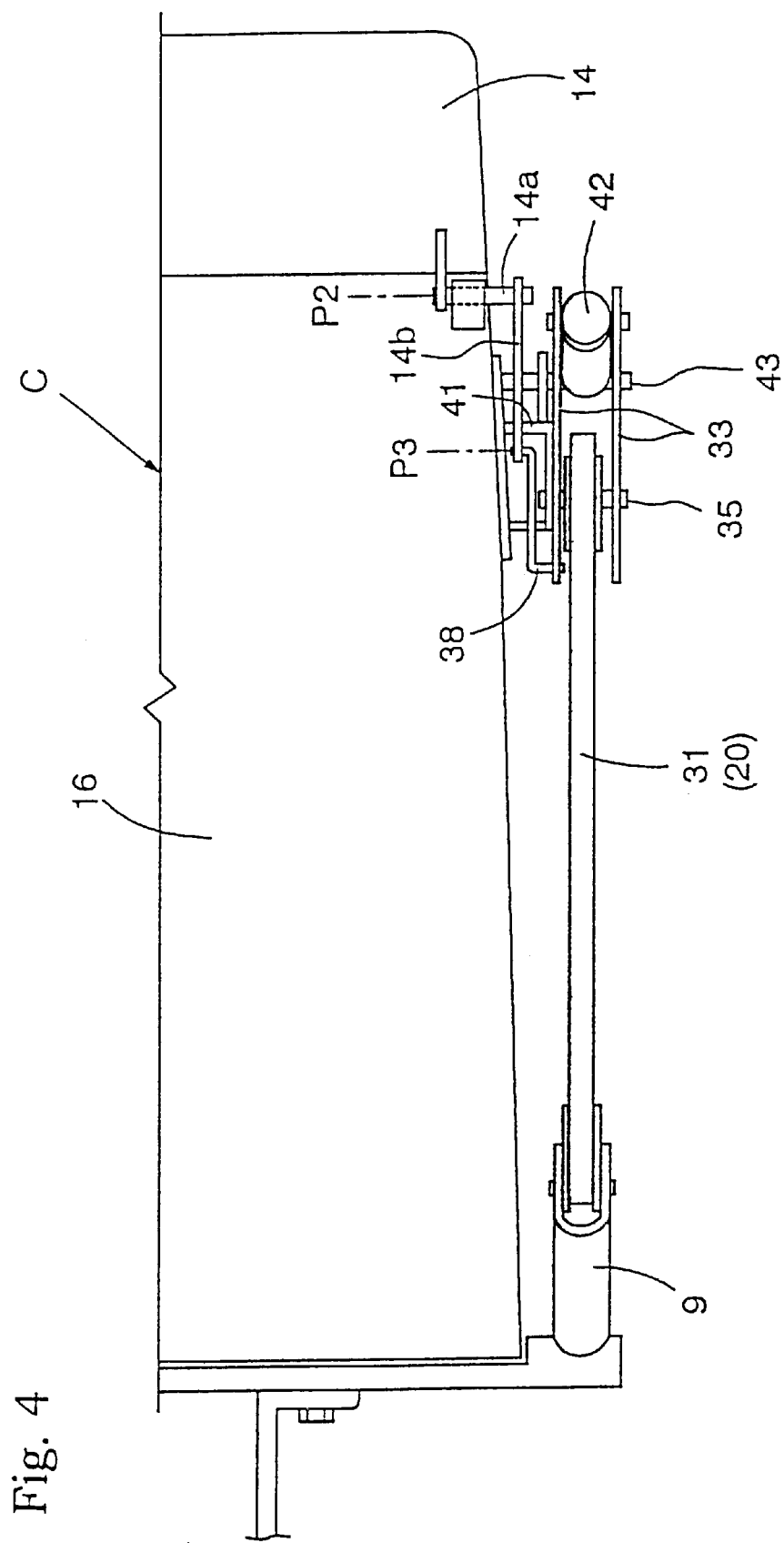
FIG. 4 is a plan view of a left portion of the grass collecting device.

As shown in FIGS. 3 and 4, the grass catcher 10 is in the form of an approximately cubic box, with a metal frame 15 having an L-shaped section, and outer wall plates 16 formed of a thin metal plate material and bolted to the frame 15. The frame 15 and outer wall plates 16 may be assembled together and disassembled from one another by turning the bolts.

The grass catcher 10 includes a container body 11 having an inlet opening 12 formed at one end thereof and an outlet opening 13 formed at the other end, and a lid 14 for opening and closing the outlet opening 13. The inlet opening 12 is shaped and sized to fit around the end of duct 8. The outlet opening 13 has the same sectional shape as the container body 11 in the form of a square tube. The lid 14 is pivotable about a pivotal axis 14a at the upper end of the outlet opening 13 to switch between a position for closing the outlet opening 13 and a position for opening the outlet opening 13.

In a grass clippings collecting posture of the grass catcher 10, the inlet opening 12 is directed forward and the outlet opening 13 directed rearward in the traveling direction of the mower. Outer lateral wall plates 16 disposed in right and left positions, and a outer top wall plate disposed in an upper position, in the above-noted posture of the grass catcher 10, are formed of perforated metal defining numerous pores for letting out air flows entering the grass catcher 10. An outer wall plate 16 corresponding to the bottom, and an outer front wall plate 16 except the inlet opening 12, are formed of non-porous metal plates. An outer wall plate 15 of lid 14 also is formed of a non-porous meal plate.
[Support Link Mechanism]

The support link mechanism 20 includes a quadric crank mechanism 30 and a rotating mechanism 40 for switching the postures of grass catcher 10 having the above construction. The quadric crank mechanism 30 includes a pair of right and left top links 31 and a pair of right and left lower links 32 attached, to be vertically pivotable about transverse axes, to the mounting posts 9 fixed to the rear ends of body frames 1 in rear positions of vehicle body 80. The upper and lower links 31 and 32 at each side have rear ends thereof pivotally interconnected through an end link 33. This quadric crank mechanism 30 translates the grass catcher 10 obliquely rearward and upward in a posture substantially parallel to the grass clippings collecting posture.

In the quadric crank mechanism 30, upper positions of the mounting posts 9 where the top links 31 and lower links 32 are attached act as fixed links 9a. The lower links 32 driven by hydraulic lift cylinders 34 act as drive links. The top links 31 act as driven links. The end links 33 act as intermediary links.

When the grass catcher 10 is in the grass clippings collecting posture, the fixed links 9a are positioned at a far higher level than the intermediary links 33 so that the top links 31 and lower links 32 extend with an angle of inclination approximately from 30 to 50 degrees.

Figure 5:
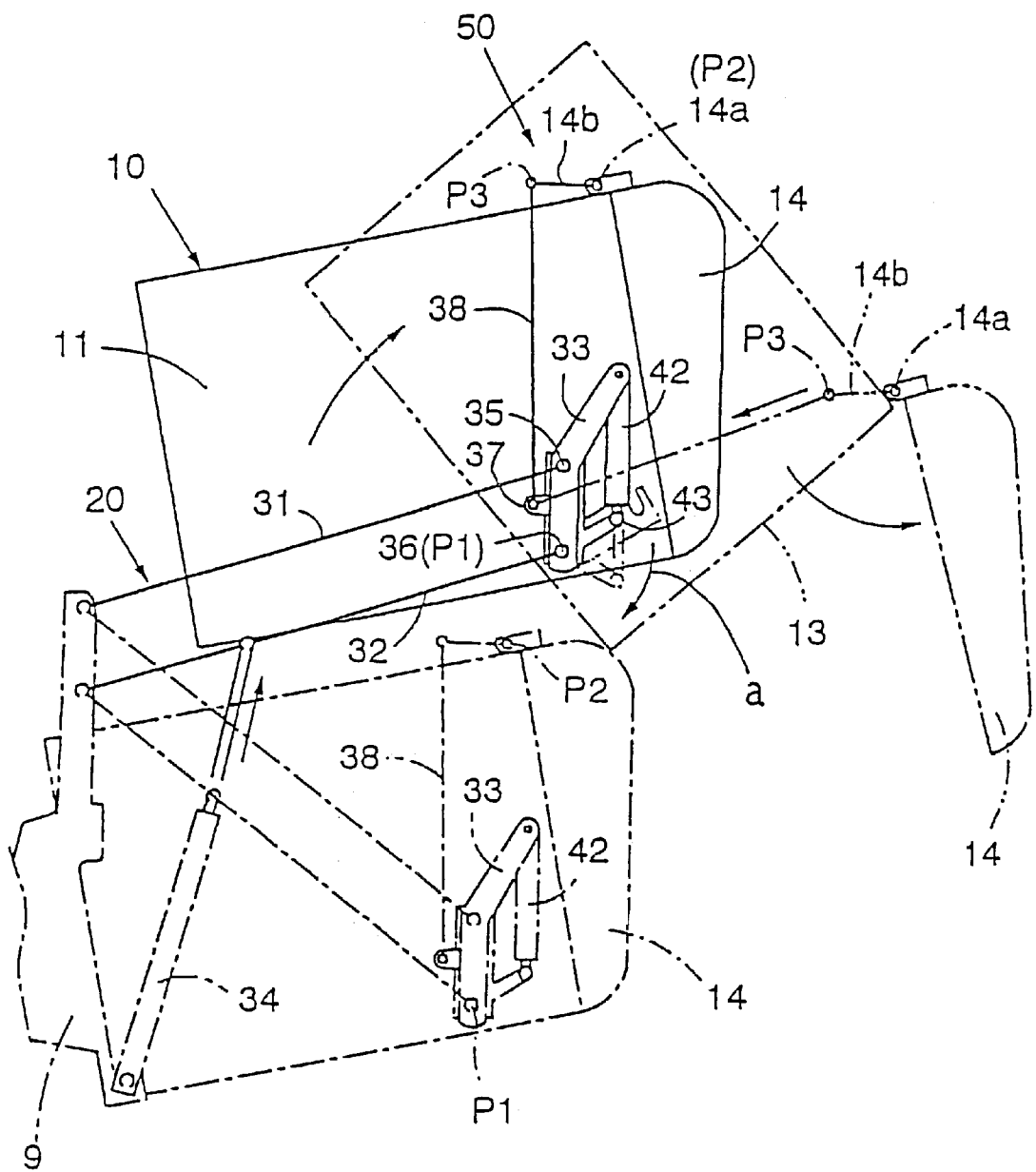
FIG. 5 is an explanatory view showing operation of the grass collecting device.

As shown in FIGS. 3 through 5, the quadric crank mechanism 30 is actuated by the hydraulic lift cylinders 34 extending between the mounting posts 9 and lower links 32, to translate the grass catcher 10 obliquely rearward and upward in a posture substantially parallel to the grass clippings collecting posture.

The rotating mechanism 40 is connected to the end links 33 to swing the grass catcher 10 about a transverse axis P1 from the posture parallel to the grass clippings collecting posture to a raised dumping posture.

The rotating mechanism 40 includes a swing control element 41 fixed to the frame 15 of grass catcher 10 in each lateral position of grass catcher 10, and a hydraulic swing cylinder 42 for forcibly swinging the control element 41 about the transverse axis P1 relative to the end link 33.

The relative swinging movement between the end link 33 and control element 41 is performed as follows.

As shown in FIGS. 3 through 5, each end link 33 includes plates bent into a bell crank form and having the top link 31 and lower link 32 placed in between. These plates are interconnected by an intermediate pin 35 also connected to the top link 31, and a pivot pin 36 also connected to the lower link 32.

Each swing control element 41 fixed to the grass catcher 10 defines a pair of upper and lower cutouts 44 and 45 engaged with the intermediate pin 35 and pivot pin 36. Each swing control element 41 has, formed integral therewith, a support rod 43 for supporting the hydraulic swing cylinder 42 connected to the upper end of end link 33.

The grass catcher 10 is rotated after being translated obliquely rearward and upward in a posture substantially parallel to the grass clippings collecting posture. For rotating the grass catcher 10, the hydraulic swing cylinder 42 is extended from the state shown in FIGS. 1 and 3. Then, the entire grass catcher 10 rotates clockwise about the pivot pin 36 as indicated by an arrow a in FIG. 5. At this time, each end link 33 does not pivot, whereby the intermediate pin 35 becomes disengaged from the upper cutout 44 of the swing control element 41. As shown in phantom lines in FIG. 5, the grass catcher 10 is raised to a dumping posture with the outlet opening 13 facing downward.

Figure 6:
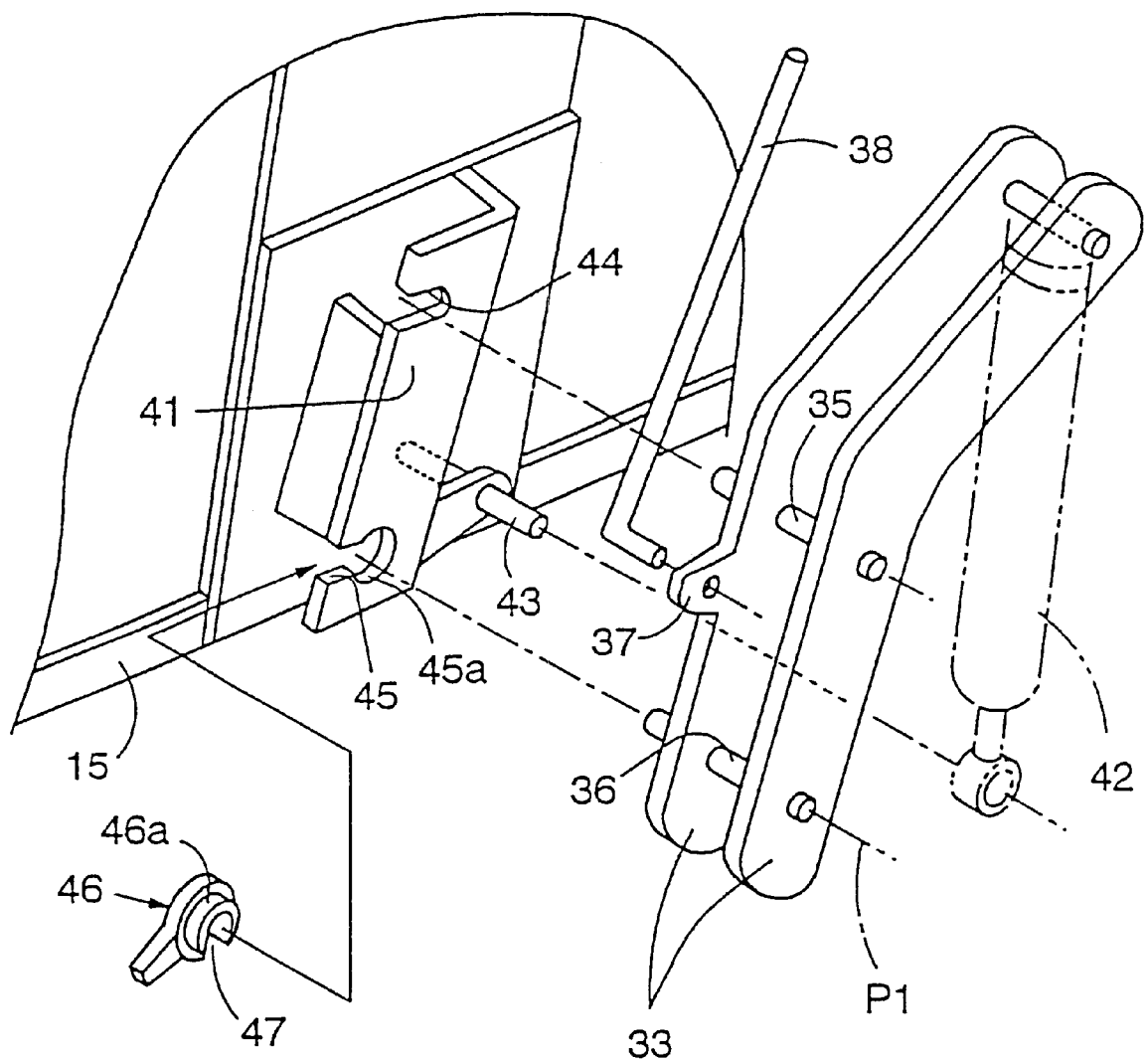
FIG. 6 is an exploded perspective view of a rotating mechanism of the grass collecting device and adjacent components.
Figure 7:
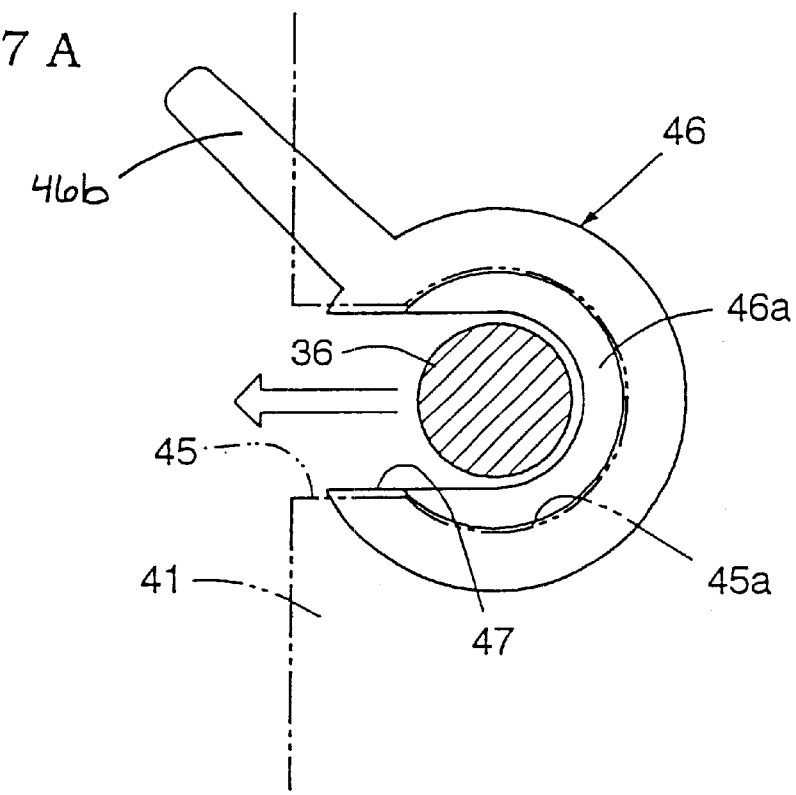
FIGS. 7A and 7B are explanatory views showing a retaining device.
Figure 7:
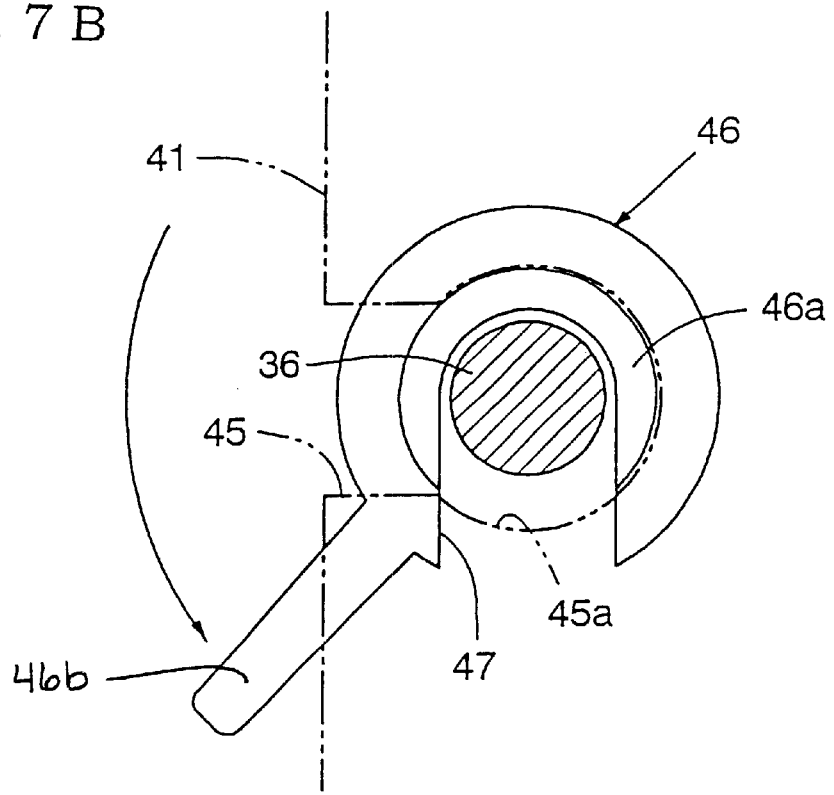

The lower cutout 45 is formed in each swing control element 41 in order to facilitate assembly and disassembly of the quadric crank mechanism 30 and grass catcher 10. The lower cutout 45 has a retaining device 46 as shown in FIGS. 6, 7A and 7B.

Specifically, the lower cutout 45 is in the form of a keyhole with a narrow inlet and a larger, circular deep end. The retaining device 46 has a dowel-like projection 46a fitted in the large circular part 45a. In the position shown in FIG. 7B, the retaining device 46 retains the pivot pin 36 in the cutout 46. When a handle 46b is turned from the position shown in FIG. 7B to the position shown in FIG. 7A, a cutout 47 formed in the retainer device 46 registers with the lower portion cutouts 45 to release the pivot pin 36. Subsequently, the entire grass catcher 10 may be detached by disconnecting the hydraulic swing cylinders 42, and disconnecting the end links 33 from connecting rods 38 of a lid opening mechanism 50 described hereinafter.

Each end link 33 has an engaging projection 37 formed in an intermediate position thereof. The engaging projection 37 defines a receiving bore for receiving a connecting rod 38 interlocked to an arm 14b pivotable with the lid 14.

Thus, when the entire grass catcher 10 is rotated about the pivot pin 36 by the hydraulic swing cylinders 42, each connecting rod 38 connected to the stationary engaging projection 37 draws the arm 14b, thereby swinging open the lid 14. That is, the arm 14b shares a common pivotal axis P2 with the lid 14, and this axis P2 is more remote from the transverse axis P1 on which the pivot pin 36 is located, than from a connection point P3 at the end of arm 38 when the lid 14 is in the closed position. This difference in distance results in the above drawing action to open the lid 14. These components constitute the lid opening mechanism 50 for opening the lid 14 by using the operating force of hydraulic swing cylinders 42.

[Other Embodiments]

Other embodiments of this invention will be listed below.

[1] The mower may be the front-mount type.

[2] The invention is not limited to the feature of opening the outlet opening 13 by using the drive for raising and rotating the grass catcher to the dumping posture. The outlet opening 13 may be locked shut and this lock may be released manually independently of the rotation of the grass catcher.

[3] The quadric crank mechanism 30 need not necessarily be in the form of a perfect parallelogram linkage. An appropriate construction may be employed therefor. For example, individual links may have slightly different lengths so that the grass catcher 10 raised may be somewhat inclined rearward. In this invention, varied movements resulting from such varied constructions are collectively called a substantially parallel movement.

[4] The mechanism for causing a substantially parallel movement obliquely upward and rearward may use slide rails. In this case, the hydraulic cylinders may be replaced with a winch mechanism using an electric motor for raising and rotating the grass catcher to a dumping posture.

[5] The hydraulic lift cylinders 34 and hydraulic swing cylinders 42 are not limited to the type controlled by separate operations. For example, a common control unit may be operated in response to on/off operation of a single control switch (not shown) to operate electromagnetic valves for controlling to the cylinders 34 and 42 in a series of operations based on a sequence control.

[6] The inlet opening of grass catcher 10 may have a double-door device (not shown) biased to a closing position. Such a device may be opened by the rear end of duct 8 inserted into the grass catcher 10, and closed when the rear end is withdrawn from the grass catcher 10.

What is claimed is:

1. A mower comprising:

a vehicle body;

a mower unit connected to said vehicle body;

a grass catcher for collecting grass clippings transmitted from said mower unit, said grass catcher having an inlet opening in a front position thereof, an outlet opening and an openable lid in a rear position, and a transverse axis extending in a lower region of said rear position for rotating said grass catcher; and a grass catcher support unit for connecting said grass catcher to a rear end of said vehicle body to be supported in a suspended state, said grass catcher support unit including:

mounting posts attached to said rear end of said vehicle body and extending upward;

a support link mechanism for switching said grass catcher between a grass clippings collecting posture with said inlet opening directed forwardly of said vehicle body, and a raised dumping posture with said outlet opening directed downward, said support link mechanism including members for interconnecting upper regions of said mounting posts and lower rearward regions of said grass catcher, said link members taking a posture oblique rearward and downward when said grass catcher is switched over to said grass clippings collection posture;

wherein said support link mechanism performs a switching process for switching said grass catcher from said grass clippings collecting posture to said raised dumping posture, said switching process including:

a translating process for causing said link members to take a substantially horizontal posture from said posture oblique, to move said grass catcher rearward away from said rear end of said vehicle body, and for translating said grass catcher obliquely rearward and upward while maintaining said grass catcher substantially parallel to said grass clippings collecting posture, and a subsequent rotating process for rotating said grass catcher about said transverse axis until said outlet opening is directed downward.

2. A mower as defined in claim 1, wherein said support link mechanism includes a quadric crank mechanism having fixed links disposed in said upper regions of said mounting posts, and intermediary links disposed in said lower rearward regions of said grass catcher and extending substantially parallel to said fixed links, and a rotating mechanism for rotating said grass catcher about said transverse axis relative to said intermediary links.

3. A mower as defined in claim 2, wherein said link members include top links and lower links interconnecting said fixed links and said intermediary links, and extending with an angle of inclination approximately from 30 to 50 degrees in said grass clippings collecting posture of said grass catcher.

4. A mower as defined in claim 1, further comprising a lid opening mechanism for converting a rotation of said grass catcher to said dumping posture, into a movement for opening said openable lid.

5. A mower as defined in claim 1, wherein an angle of elevation when said grass catcher is in said raised dumping posture is set to be substantially smaller than an angle of depression when said grass catcher is in said grass clippings collecting posture.

* * * * *

UNITED STATES PATENT AND TRADEMARK OFFICE
CERTIFICATE OF CORRECTION

PATENT NO. : 6,513,312 B1  Page 1 of 1
DATED : February 4, 2003
INVENTOR(S) : Shoso Ishimori et al.

It is certified that error appears in the above-identified patent and that said Letters Patent is hereby corrected as shown below:

Column 2,
Line 41, "size may" should read -- size and may --.

Column 3,
Line 60, "frames 1, Grass" should read -- frames 1. Grass --.

Column 6,
Line 66, "including members" should read -- including link members --.

Signed and Sealed this

First Day of July, 2003

JAMES E. ROGAN
*Director of the United States Patent and Trademark Office*